Nov. 4, 1958     H. A. TOULMIN, JR     2,858,755
MOBILE IMPLEMENT FOR FLAME TREATING SOIL
Filed Feb. 15, 1955     4 Sheets-Sheet 1
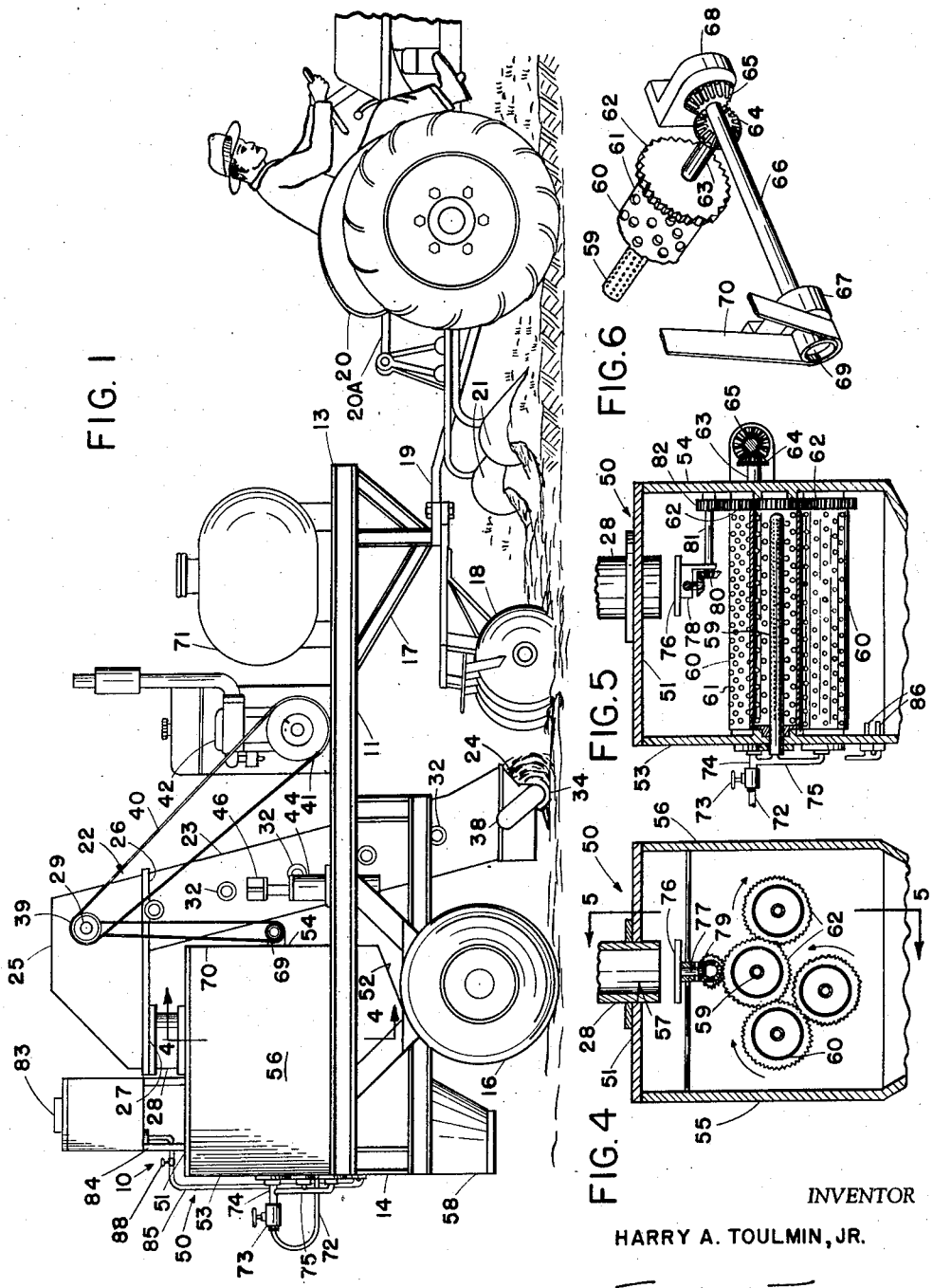
INVENTOR
HARRY A. TOULMIN, JR.
BY *Toulmin & Toulmin*
ATTORNEYS

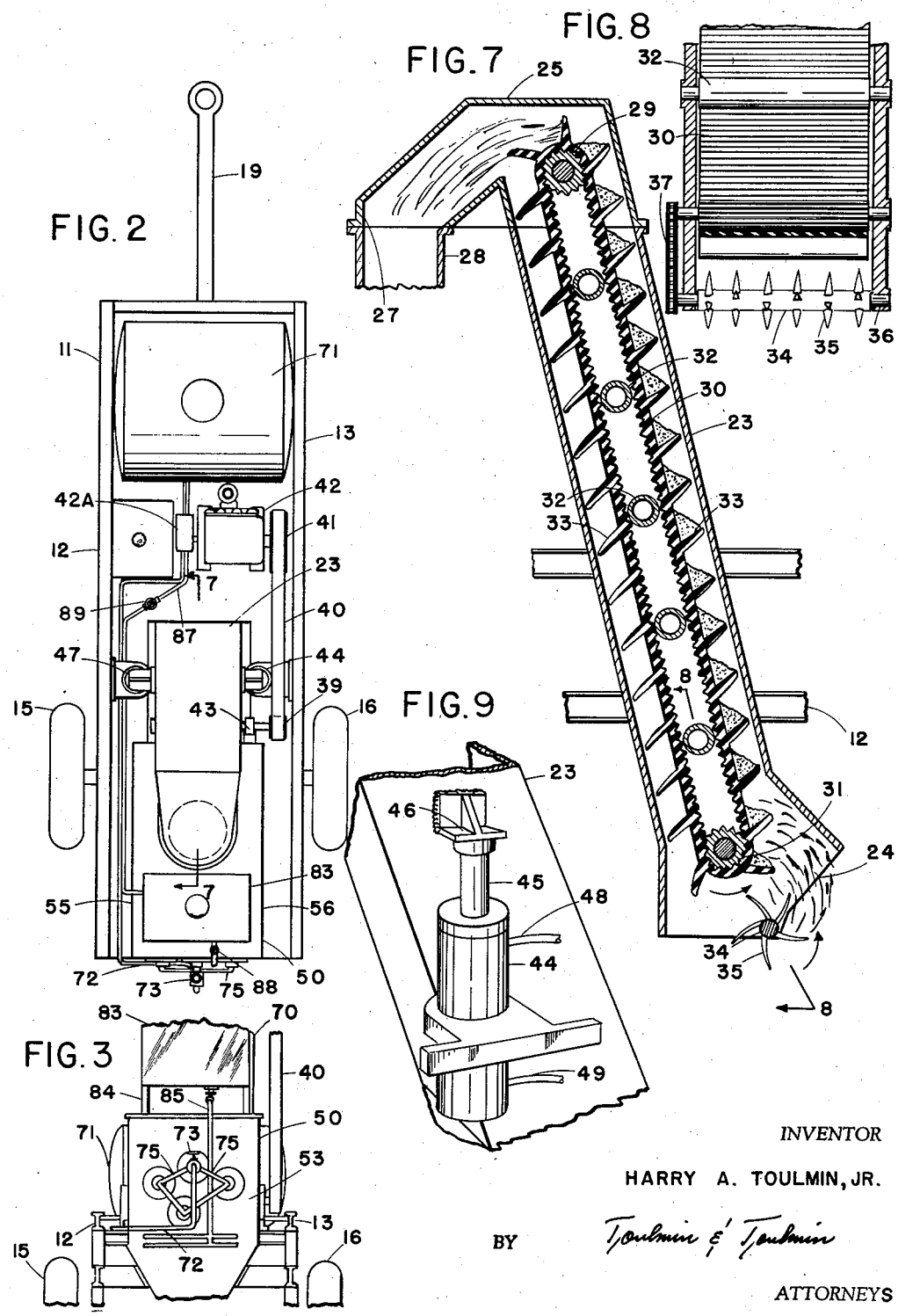

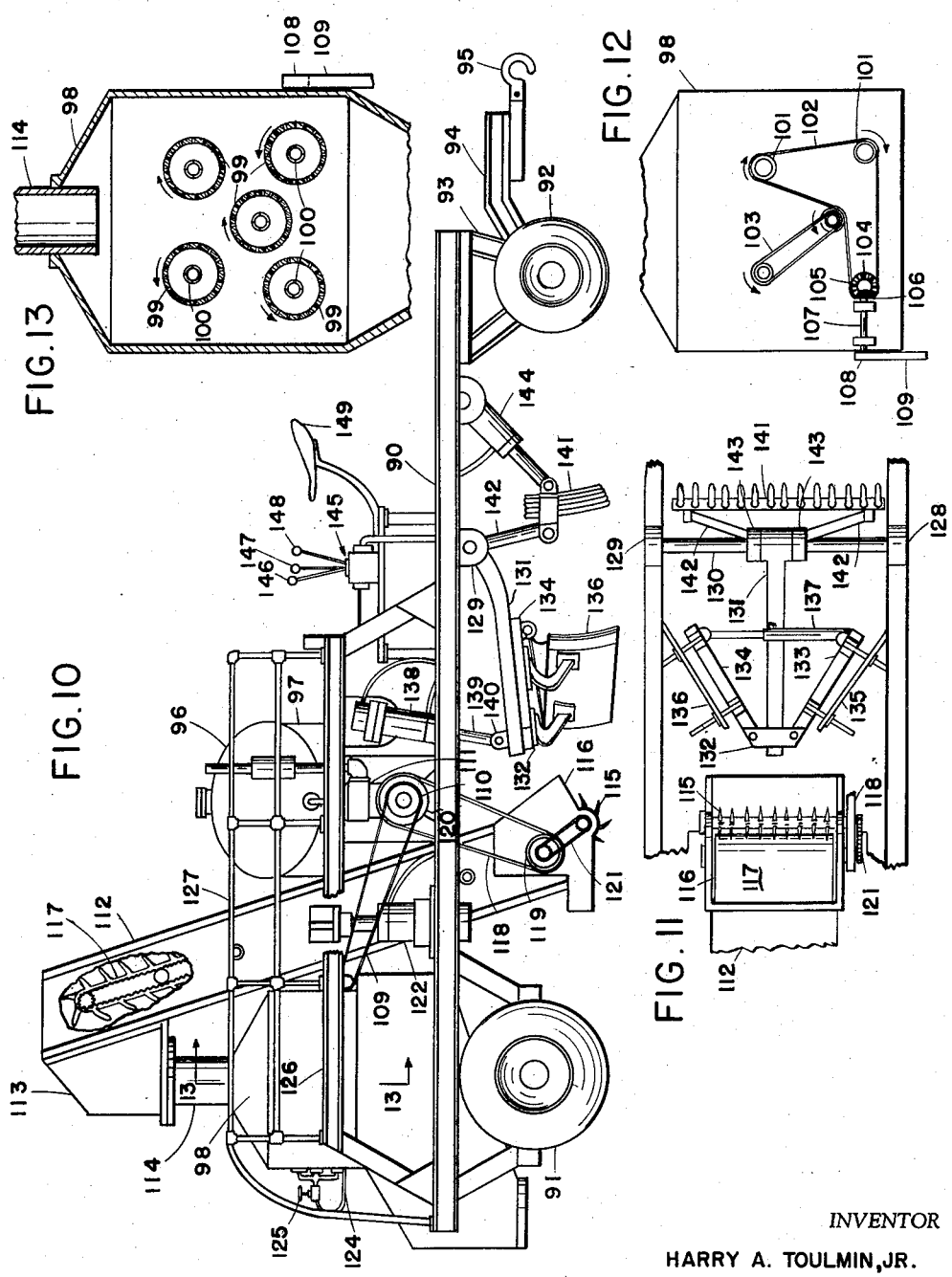

Nov. 4, 1958     H. A. TOULMIN, JR     2,858,755
MOBILE IMPLEMENT FOR FLAME TREATING SOIL
Filed Feb. 15, 1955     4 Sheets-Sheet 4

INVENTOR
HARRY A. TOULMIN, JR.
BY
ATTORNEYS

United States Patent Office 2,858,755
Patented Nov. 4, 1958

2,858,755

MOBILE IMPLEMENT FOR FLAME TREATING SOIL

Harry A. Toulmin, Jr., Dayton, Ohio, assignor to The Commonwealth Engineering Company of Ohio, Dayton, Ohio Application February 15, 1955, Serial No. 488,335

5 Claims. (Cl. 97—10)

The present invention relates to the cultivation of soil, more particularly to treating the soil during cultivation to convert the soil into a condition of physical uniformity.

It is recognized that because of the increasing population there must be a corresponding increase in the production of food. Agriculture is attempting to meet this situation by increasing the crop yield from each acre of ground under cultivation. Several devices, such as new improved fertilizers and soil conditioners, and improved techniques of agriculture such as crop rotation and the like, have been employed with some success. However, while these devices have been employed to increase the crop yield, no emphasis has been placed upon soil as a commodity or product which is a raw material in the production of a crop.

In order to increase the yield from a plot of ground it is desirable that each portion of the ground yield a uniform crop. This uniform yield per unit of ground cannot be accomplished unless the soil throughout the entire field is in a uniform condition. Therefore, while modern methods of cultivation and fertilizing may provide nutrients in the soil, soil conditions may vary considerably in different portions of the field. It is by converting all of the soil in the field into a condition of physical uniformity that the yield for that plot of ground can be increased. Soil is considered to be physically uniform when all the particles of soil are of a uniform size and fertilizer and soil conditioners are evenly distributed throughout the soil to the depth of cultivation to result in a soil having a substantially equal chemical content throughout.

The present invention considers the soil to be a new product or raw material which must be standardized through manufacture in order to obtain improved crop yield. It is recognized that if a new raw material product or soil could be utilized during planting of a new crop, a considerable advance would be made in increasing food production. Since the roots of most crops permeate into the ground to a depth of approximately two feet, the sub-soil to that depth must be treated as a new product.

In this invention an apparatus and method is disclosed which provides for the removing of the soil from the ground, converting the soil to a condition of physical uniformity, and replacing the soil on the ground at a point remote from the origin of the soil.

As the primary step in achieving this uniform new product the soil must be turned over in order to bring up the chemicals which accumulate beneath the surface of the ground and the clumps of soil must be reduced to result in finer soil particles. The disclosed apparatus of this invention plows and then disks the soil into a rough mixture. This rough mixture of soil is next removed from the ground and passed through flames. The flames serve both to disintegrate the clumps of soil and to burn out the weeds and weed seed therein. This flame-treated soil may then be injected with a fertilizer in either liquid or dust form. Since the soil has been reduced to small, uniform particles it can be seen that the fertilizer and the soil intermix to form a substantially uniform texture. This uniform mixture of soil is moved horizontally and is discharged onto the field at a point remote from the origin of the soil. By proceeding over the entire surface of the field in a systematic manner, it can be seen that the soil condition of the field as a whole is converted into a state of physical uniformity.

Previously provision has been made for use of modified converted flame throwers to destroy the portions of stalks which remain in the ground after the crop has been harvested. However, little attention has been paid to eliminating the weed seeds which are lodged in the ground beneath the surface. Consequently, by providing an apparatus which digs up the ground and scatters the soil through flames, all the weed seeds and other combustible material in the soil may be readily destroyed. Subjecting the soil to the action of flames would also destroy insect larvae. This would tend to eliminate the possibility of the crop being subsequently damaged by the action of insects. This cleaning of the soil contributes in converting the soil to a uniform condition.

This invention proposes to mount the soil treating structure in combination with a plow and harrow whereby the plowing, harrowing and treating of the soil can be carried on in a single continuous operation. Consequently, the soil may be conditioned and cleaned of weed seed and the like in a single labor and time saving operation.

Certain modifications of the apparatus to accomplish this soil conditioning are also disclosed. One modification comprises a wheeled frame from which is supported a rake harrow, blade scrapers to gather the soil in a row, and scooping means to scoop the soil from the row and convey the soil into a treating chamber. Means are provided in this modification to adjust the heights of the harrow, scrapers and scooping means in respect to the surface of the ground.

Another modification of this invention comprises a wheeled frame which tows a scooping apparatus for gathering the cultivated soil and scattering it in the air behind the frame, wherein it is subjected to the action of flames originating from the rear portion of the wheeled frame.

Each of the above-mentioned modifications will be subsequently described in detail.

It is, therefore, the principal object of this invention to provide an apparatus for cultivating and conditioning the soil in one continuous operation.

It is a further object of this invention to provide an apparatus for processing the soil of an entire field into physical uniformity prior to the planting of the crop therein.

It is an additional object of this invention to provide a single combination agricultural implement for plowing and harrowing the soil, and in addition for converting the soil into physical uniformity while simultaneously injecting fertilizer into the soil.

It is still a further object of this invention to provide an agricultural implement for removing weeds and insect larvae from the soil while reducing the soil to physical uniformity.

It is still another object of this invention to provide an agricultural implement for removing weeds, weed seeds, and insect larvae and the like, by exposing the scattered soil to the action of flames.

It is still an additional object of this invention to provide a novel and improved method of cultivating the soil.

It is yet another object of this invention to provide a method of cultivation which entails the conversion of the soil into a condition of physical uniformity.

It is yet a still further object of this invention to provide a method of removing weeds, insect larvae and the like from soil.

It is yet an additional object of this invention to provide a method of conditioning the soil during the cultivation thereof.

Other objects and advantages of this invention will become readily apparent upon reference to the following description when taken in conjunction with the accompanying drawings wherein:

Figure 1 is a side elevational view of the agricultural implement disclosed as this invention;

Figure 2 is a top plan view of the implement as illustrated in Figure 1;

Figure 3 is a rear elevational view of the agricultural implement illustrated in Figures 1 and 2;

Figure 4 is a sectional view taken along the lines 4—4 of Figure 1 and showing the arrangement of the revolving burners within the chamber;

Figure 5 is a sectional view taken along the lines 5—5 of Figure 4;

Figure 6 is a detailed view showing the gearing by which power is transmitted to one of the revolving burners to rotate the burner;

Figure 7 is a sectional view taken along the line 7—7 of Figure 2, and showing the construction of the elevator conveyor;

Figure 8 is a sectional view taken along the line 8—8 of Figure 7, and illustrating the scooping means for gathering the dirt and throwing it onto the elevator conveyor belt;

Figure 9 is a perspective view of one of the hydraulic cylinders which is employed to raise and lower the elevator conveyor with respect to the ground;

Figure 10 is a side elevational view of a modification of the agricultural implement of this invention;

Figure 11 is a bottom plan view of a portion of the agricultural implement illustrated in Figure 10, showing the relationship of the rake harrow, the scraper blades and the scooping means;

Figure 12 is a front elevational view of the front wall of the treating chamber employed in the modification illustrated in Figure 10, and showing the means for driving each of the revolving burners within the treating chamber;

Figure 13 is a sectional view taken along the line 13—13 of Figure 10, and showing the arrangement of the revolving burners within the treating chamber;

Figure 14:
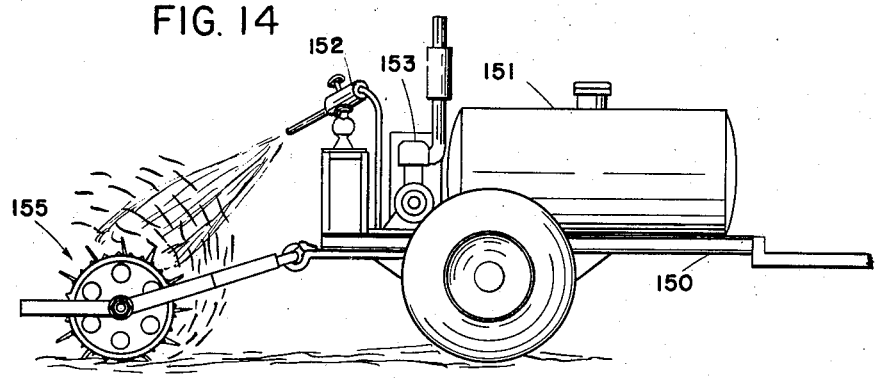
Figure 14 is a side elevational view of another of the agricultural implements disclosed as this invention.

Returning now to the drawings, and more particularly to Figure 1 wherein like reference numerals indicate the same parts throughout the various views, 10 indicates generally the agricultural implement disclosed as this invention. The agricultural implement 10 essentially comprises a frame 11 which in turn comprises a pair of parallel longitudinally extending I-beams 12 and 13. Suitable supporting structure, indicated at 14, depends from the frame 11 and carries ground wheels 15 and 16. Each of the ground wheels 15 and 16 is equipped with a rubber tire.

Depending from the front portion of the frame 11 is a harrow supporting structure 17 from which is pivotally secured a disk harrow 18. A tongue beam 19 is also pivotally secured to the harrow structure 17 and is connected to the hitch of a tractor 20 which is employed to tow the agricultural implement 10. A plurality of mold board plows indicated at 21 are secured by means of a conventional Ferguson hitch 20A to the rear of the tractor 20. The Ferguson hitch may be adjusted to vary the depth to which the plows 21 will penetrate the soil. Hence, either the top soil or the subsoil to a depth of about two feet may be selectively turned over.

Mounted in the frame 11 behind the disk harrow 18 is an elevator conveyor indicated generally at 22. The conveyor 22 comprises a substantially vertically extending casing 23 which is rectangular in cross section and has the lower end thereof open, as indicated at 24. At the upper end of the casing 22 there is mounted a U-shaped duct 25 which has an end 26 secured to the top end of the casing 23. At the other open end 27 of the duct 25 there is fastened a cylindrical duct 28.

Mounted in the U-shaped duct 25 is an upper sprocket 29 which supports one end of a conveyor belt 30. The lower end of the conveyor belt 30 is supported upon a lower sprocket 31 which is rotatably mounted in the lower end of the conveyor casing 23. A plurality of idler pulleys 32 are spaced along the length of the conveyor belt 30 between the two reaches thereof. The conveyor belt 30 has a plurality of shelf-like members 33 thereon, each of which is adapted to retain soil thereon.

Also mounted in the open lower end of the conveyor casing 23 is a rotating scoop 34. The scoop comprises a plurality of curved arms 35 which are adapted to dig into the soil down to a depth of about twenty-four inches and hurl the soil upwardly onto the conveyor belt 30 in the manner shown in Figure 7. The scoop 34 has a shaft 36 which is drivingly connected by means of a belt 37 to the lower sprocket 31 of the conveyor belt. The drive belt 37 is covered by a housing 38.

One end of the upper sprocket 29 has secured thereon a pulley 39. This pulley is drivingly connected by means of a belt 40 to a driving pulley 41 mounted on the end of the drive shaft of a gasoline engine, as indicated at 42. The engine 42 is suitably mounted upon the frame 11.

Thus, it can be seen that driving the upper sprocket 29 will, in turn, drive the conveyor belt 30, and the conveyor belt, by virtue of its toothed construction, will drive the lower sprocket 31 which subsequently will drive the rotary scoop 34.

A second pulley 43 is also mounted on the extension of the shaft on the upper sprocket 29. The purpose of the pulley 43 will be later described.

Proceeding now to Figure 9, there is depicted a hydraulic cylinder 44 mounted upon the I-beam 13 and which has protruding therefrom a piston shaft 45 which is connected to a bracket 46 mounted on the side wall of the conveyor casing 23. A second hydraulic cylinder 47 is similarly mounted on the I-beam 12 and connected to the opposite side wall of the conveyor casing 23. Hydraulic lines 48 and 49 lead to a suitable hydraulic pump. The hydraulic pump and the controls therefor are conventional.

Mounted on the rear portion of the frame is a treating chamber 50. The treating chamber 50 is substantially rectangular in shape, as shown in Figures 4 and 5, and comprises a top wall 51, and a bottom wall 52. The top and bottom walls are interconnected by means of end walls 53 and 54, and side walls 55 and 56 to form the chamber.

The top wall 51 of the treating chamber has an opening 57 which slidably receives the cylindrical duct 28 which extends from the U-shaped duct 25. The bottom wall 52 has a discharge outlet 58 in the rearward portion thereof. In addition, the bottom wall is inclined toward the discharge outlet.

Rigidly secured in the end wall 53 and extending into the treating chamber 50 is a plurality of hollow perforated tubular burners 59 upon each of which is rotatably mounted a shield or flame distributor 60. The shield is a perforated cylinder which, when rotating, distributes the flames emanating from the burner 59 and also shields the burner 59 from the dirt passing through the treating chamber. The burner 59 and shield 60 comprise a burner unit 61. Intermeshed gear means 62 are mounted on one end of each of the burners 61, as shown in Figure 4.

One of the revolvable shields 60 has a shaft 63 extending therefrom and protruding through the end wall 54 of the treating chamber. A bevelled gear 64 is fixed upon the outer end of the extension 63 and engages a second bevel gear 65 which is mounted upon a shaft 66 journalled in supports 67 and 68 which are mounted on the outer face of the end wall 54. A pulley 69 is rigidly secured to one end of the shaft 66 and is drivingly connected by means of a belt 70 to the pulley 43 which is mounted upon the shaft of the upper sprocket carried within the elevator conveyor casing. Consequently, the engine 42 serves both to drive the elevator conveyor and to rotate the revolvable burners mounted within the treating chamber.

Fuel for the burners 59 is stored in a tank 71 which is mounted on the forward end of the frame 11 above the disk harrow 18. The fuel may be either gaseous or liquid. A fuel line 72 extends from the tank 71 to the valve 73. A line 74 extends from the valve 73 to the upper one of the burners. Distribution lines 75 serve to interconnect the line 74 with each of the remaining burners in the manner shown in Figure 3. A compressor 42a is operated by the engine 42 to maintain the fuel system under sufficient pressure to assure the constant flow of fuel.

A scattering device 76 is mounted within the treating chamber 50 beneath the open end of the duct 28 where it projects into the chamber. The scattering device has a shaft 77 which is rotatably mounted in brackets 78. There is a bevel gear 79 on the lower end of the shaft 77 and said bevel gear engages a bevel gear 80 secured upon a shaft 81 which is rotatably journalled in the end wall 54 and brackets 78. A spur gear 82 is fixed upon the shaft 81 and drivingly engages the intermeshed gear means 62 on the revolvable burners to operate the scattering device.

A fertilizer storage tank 83 is mounted by means of a frame 84 above the treating chamber 50. Either liquid or powdered fertilizer may be contained within the storage tank. A fertilizer feed line 85 leads to discharge nozzles 86 which are mounted in the rear wall 53 of the treating chamber. An air conduit 87 leads from the compressor 42A to the fertilizer storage tank to maintain the fertilizer under sufficient pressure to pass to the nozzles 86. There is a control valve 88 in the feed line 85. There is also a valve 89 in the air conduit to regulate the pressure within the fertilizer storage tank.

Anhydrous ammonia may be readily used as a fertilizer and may be sprayed into the treating chamber. However, any other liquid or powdered fertilizer containing proper proportions of nitrogen, phosphorus and potassium may be intermixed with the flame-treated soil.

Proceeding now to Figures 10 through 13, there is illustrated therein a modification of the agricultural implement disclosed as this invention. This modification basically includes the same elements comprising the embodiment illustrated in Figures 1 through 9. In addition the modification comprises a rake harrow and scraper blades for gathering the tilled earth into a row. Also hydraulic means are provided for adjusting the height of these last-mentioned structures above the ground.

The embodiment illustrated in Figures 10 through 13 has a frame 90 essentially comprising a pair of parallel I-beams. The frame is mounted upon rear wheels 91 and front wheels 92 which latter wheels are steeringly mounted upon a front wheel supporting structure 93. A tongue beam 94 is pivotally mounted to the front wheel supporting structure and is connected to a tractor by a hook 95.

Similar to the embodiment illustrated in Figures 1 through 9, the modification of Figure 10 has a fuel tank 96 mounted upon the frame 90. Fuel tank 96 is mounted and spaced above the central portion of the frame 90 by means of a supporting structure 97.

A treating chamber 98 is mounted upon the rear portion of the frame 90.

A plurality of revolvable burners 99 are journalled in the end walls of the treating chamber 98. Each of the burners 99 is mounted on a hollow burner tube 100. Each burner 99 has a shaft which protrudes beyond the end wall of the treating chamber 98. A pulley 101 is mounted on the projecting portion of each of the burner shafts. Suitable belt means 102 and 103, drivingly interconnect all of the pulleys 101 to a driving pulley 104 which has a bevel gear 105 thereon in mesh with a second bevel gear 106 fixed upon a shaft 107. Shaft 107 has a pulley 108 which is drivingly connected by means of a belt 109 to a pulley 110 fixed upon the drive shaft of a gasoline engine 111 which is mounted upon the frame 90. The engine 111 drives a compressor which maintains the fuel distribution system under pressure.

If desired, suitable means to inject fertilizer into the treating chamber and a soil scattering device may be installed as described in the embodiment of the invention shown in Figures 1-9.

Mounted forwardly of the treating chamber 98 is an elevator conveyor 112 which is similar in construction and operation to the elevator conveyor employed in the embodiment of the invention described in Figures 1 through 9. The elevator conveyor 112 has a duct 113 at the upper end thereof which connects the elevator conveyor 112 with the chamber. The duct has a cylindrical portion 114 slidingly inserted into an opening located in the top wall of the treating chamber 98.

In a further similar manner a rotary scoop 115 is mounted at the lower open end 116 of the elevator conveyor.

In this modification a conveyor belt 117 is powered by means of a drive belt 118 which interconnects a pulley 119 mounted on the extended shaft of the lower conveyor belt sprocket, and a pulley 120 is mounted on the drive shaft of the gasoline engine 111. The rotary scoop 115 is similarly powered by means of a drive belt 121 interconnecting the lower sprocket of the conveyor belt and the rotary scoop shaft.

In order to provide vertical adjustment of the elevator conveyor 112 and the scoop 115, the conveyor is supported on hydraulic cylinders 122 which are mounted on the frame 90.

The fuel tank 96 is mounted above the gasoline engine 111 and has a fuel line 124 extending therefrom to a valve and distribution line system indicated at 125, which is mounted upon the rear end wall of the treating chamber 98. This valve and distribution system 124 is similar to the valve and distribution system described in connection with the embodiment of the invention illustrated in Figures 1 through 9.

A platform 126 is mounted above and on one side of the frame 90. The platform 126 permits ready access by the operator of the implement to the various components thereof. A protective rail 127 is mounted upon the platform 126.

This embodiment of the invention is provided with structure to adjust the operating depth of both the rake harrow and scraper blades. This structure comprises a pair of depending brackets 128 and 129 secured to the spaced I-beams of the frame 90. A shaft 130 is mounted between the brackets 128 and 129. On the central portion of the shaft 130 there is pivotally mounted an arm 131 at the end of which is secured a transversely extending cross member 132 at each end of which are pivotally mounted blade supporting members 133 and 134. Scraper blades 135 and 136 are suitably secured to the members 133 and 134 respectively. As may be seen in Figure 11, the scraper blades 135 and 136 are arranged in the form of a V with the apex thereof pointing rearwardly of the implement. The outer ends of the blades 135 and 136 are interconnected by means of a hydraulic cylinder and piston arrangement 137 which provides for selected angular adjustment of the blades 135 and 136.

A second hydraulic cylinder 138 having a piston arm 139 extending therefrom is employed to selectively raise and lower the scraper blades 135 and 136. The free end of the piston arm 139 is pivotally connected to a bracket 140 which is secured on the top face of the free end of the pivotally mounted arm 131.

Mounted forwardly of the scraper blades 135 and 136 is a rake harrow 141 which is also pivotally mounted from the shaft 130 by means of arms 142 which extend inwardly from both ends of the rake harrow to join collars 143 which are pivotally mounted on the shaft 130 on either side of the aforementioned pivotally mounted arm 131.

The rake harrow 141 is raised and lowered by means of a hydraulic cylinder 144 pivotally mounted on the frame 90 and having a piston arm extending therefrom which is pivotally connected to the central portion of the rake harrow 141.

To provide for the continuous adjustment of the elevator conveyor, the scraper blades and the rake harrow, a control position indicated generally at 145 is mounted on the frame 90. This control position generally comprises a hydraulic valve actuated by levers 146, 147 and 148, each of which is respectively connected so as to operate the hydraulic cylinders associated with the elevator conveyor, the scraper blades and the rake harrow. A suitable and conventional hydraulic pump and reservoir and line system is mounted on the frame 90, and need not be further described. A seat 149 is provided so that the operator of the hydraulic controls may be comfortably seated during the operation of the agricultural implement.

Figure 16:
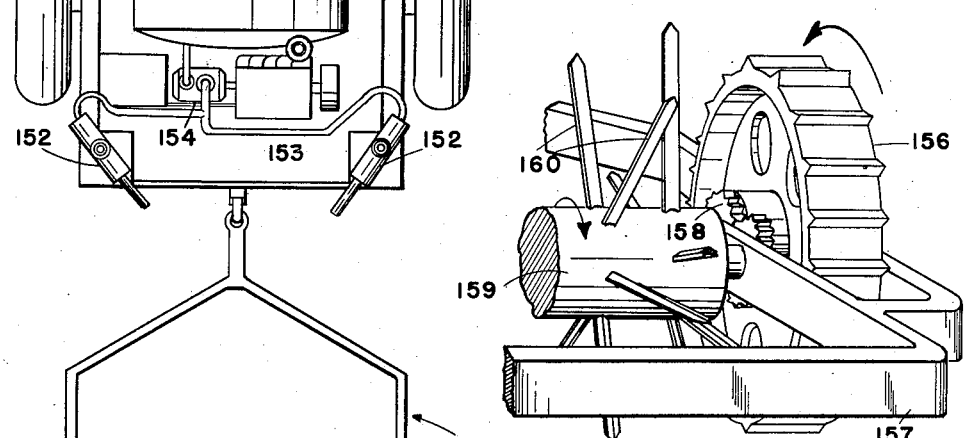
Figure 16 is a perspective view of the gearing drivingly connecting the ground wheels of the modification illustrated in Figure 14 with the soil gathering and scattering means employed therein.
Figure 15:
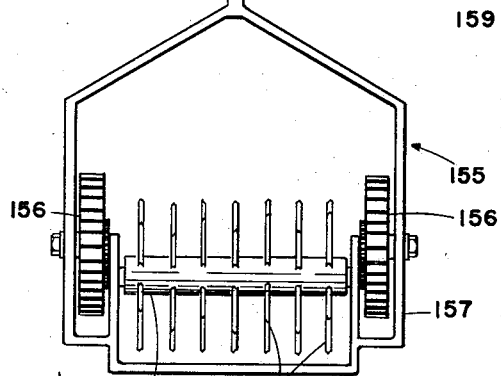
Figure 15 is a top elevational view of the modification disclosed in Figure 14.

A third modification of this invention is illustrated in Figures 14 through 16. This modification essentially comprises apparatus for flame treating the soil. This modification consists of a wheeled frame 150 which is adapted to be pulled by a tractor or a similar vehicle. Mounted upon the frame 150 is a fuel tank 151, flame throwers 152 and a gasoline engine 153 which is provided to operate a compressor 154. The compressor 154 is employed to maintain a sufficiently high pressure in the fuel tank 151 in order to insure adequate delivery of fuel to the flame throwers 152. The flame throwers 152 are mounted upon the rear corners of the frame 150 and each is directed inwardly and rearwardly in the manner indicated in Figure 15.

A soil scattering device indicated generally at 155 is connected behind the frame 150 and is adapted to be towed thereby. The soil scatterer 155 comprises ground wheels 156 mounted in a frame 157. The ground wheels 156 are connected by means of suitable gearing 158 to a shaft 159 to enable the shaft to rotate in a direction opposite to the rotation of the ground wheels. The shaft 159 has a plurality of radially extending arms 160 thereon which are adapted to dig up the soil.

Consequently, as illustrated in Figure 14, the soil is thrown upwardly and forwardly by the soil scattering device 155. The flames projected from the flame throwers 152 will contact the scattered soil for a sufficient period of time to burn the weeds and weed seeds in the soil and to disintegrate the clumps of soil.

With the structures of the three modifications of this invention in mind, a method of cultivating the soil employing this agricultural implement will now be described. Prior to the cultivation of the soil, the depth of the soil which is to be converted should be determined. Usually the depth varies from between 18 to 24 inches; this being the depth to which most crop roots descend. Having reference to the embodiment of the invention as disclosed in Figures 1 through 9, plows 21 will then be adjusted to turn over the soil to a predetermined depth. This adjustment is accomplished by suitable manipulation of the tractor hitch 20A. The rotary scoop 34 will then be lowered in order to pick up all of the dirt which is turned over by the plow. The scoop is lowered by adjusting the elevator conveyor 23.

Figure 17:
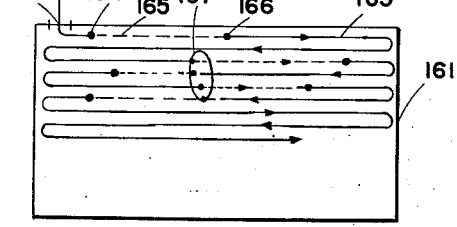
Figure 17 is a diagrammatic view of a field being cultivated in accordance with the teaching of this invention and illustrating the manner in which the soil is redistributed after being conditioned.

To further illustrate the manner in which the soil of a field is converted into physical uniformity reference is made to Figure 17 which diagrammatically illustrates a field indicated at 161. The implement enters the field at 162 and traverses the field 161 in a continuous path 163 comprising a series of reverse turns at opposite ends of the field. In this manner the entire surface of the field is systematically covered.

As the implement proceeds along the field along the indicated path, the soil turned up by the plow 21 is picked up by the rotary scoop 34 and delivered to the treating chamber 50 by means of the elevator conveyor 23. As the soil enters the chamber 50 it is deposited upon the scattering device 76 which distributes the dirt throughout the entire chamber. The scattered soil then descends by gravity through the burners 61. The action of the flames burns weed seeds, insect larvae and any other combustible material within the soil and also to disintegrate clumps of soil. The combined action of the scattering device and the burners converts the soil into uniform particles. As the flame treated soil passes through the burners 61 it may be subjected to the action of the fertilizer nozzles 86.

After the soil has been flame-treated and mixed with a fertilizer the soil is then discharged onto the ground through the discharge outlet 58. It is pointed out that during this conditioning of the soil the agricultural implement is in continuous movement. Therefore, it is at once apparent that the treated soil is discharged onto the ground at a point horizontally remote from the point where the soil was first picked up from the ground by the rotary scoop 34. By way of example, soil picked up at point 164 in the field will be treated during the dotted line portion of the path of the implement indicated at 165 and will be discharged upon the ground in a mixed condition at the point 166. Consequently, if there is an area of sour soil such as indicated at 167, this sour soil will be picked up, treated, and then discharged upon the field at a point remote from the original area of the sour soil. In this way the soil which comprises the spot 167 is redistributed upon other portions of the field 161. Consequently, the soil of the field as a whole is converted into a uniform condition.

The operation of the embodiment illustrated in Figures 10 through 13 is similar to the previously described process. It is to be noted, however, that in the Figure 10 modification the soil which is loosened is broken up by the rake harrow 141, and is formed into a row by the scraper blades 135 and 136. The rotary scoop 115 subsequently picks up the dirt from this row and delivers it to the elevator conveyor where it is discharged to the treating chamber and subjected to the flames generated therein. Upon the conclusion of the flame treating process and, if necessary, injecting fertilizer into the soil, the treated soil is discharged upon the ground at a point remote from its origin.

As mentioned previously, the modification disclosed in Figures 14 through 16 conditions the soil by scattering the soil upwardly where it is subjected to the action of the flames propagated by flame throwers mounted upon the frame of the vehicle and directed toward the soil scattering device. In each modification the modus of operation is similar. However, the modifications of Figures 1 and 10 provide for the cultivation of the soil and subsequent conditioning of the soil in one continuous operation. The modification of Figure 14 only serves to flame treat the soil.

Thus it can be seen that by considering the soil in which a crop is to be planted as a new product, a new concept is introduced into agriculture. This product is converted to a condition of physical uniformity by so processing the soil that the particles of soil are uniform throughout and that the soil throughout the entire extent of the field is substantially equal in chemical content. Consequently, sporadic crop yields are eliminated and each portion of the field will produce substantially the same amount of crop.

If it is desired to add lime or any other type of fertilizer to the soil, it can be seen that this fertilizer is distributed evenly over all portions of the soil and not only to the top part of the soil as is usually done under the present practice. Furthermore, the complete cultivation and conditioning of the soil is a single continuous operation which reduces the time and manpower previously necessary to prepare the field. By considering the soil as a manufactured product which must be standardized to obtain a higher and more uniform crop yield, it can be readily appreciated that the production of food by agriculture will keep pace with the increasing demands of a growing population.

It will be understood that this invention is susceptible to modification in order to adapt it to different uses and conditions, and, accordingly, it is desired to comprehend such modifications within this invention as may fall within the scope of the appended claims.

What is claimed is:

1. In a mobile agricultural implement for treating the soil, the combination of, a plow, a harrow for breaking up the plowed soil, revolving means for comminuting of the soil broken up by the harrow and throwing the comminuted soil upwardly and rearwardly, an elevating conveyor for receiving the thrown comminuted soil, a chamber having an opening in the top thereof for receiving the soil discharged from said elevating conveyor, means for distributing said soil throughout said chamber, means within said chamber for directing flames at said soil distributed within said chamber to burn out weeds and weed seed therein, and means for discharging the flame treated soil onto the ground.

2. In a mobile agricultural implement for treating the soil, the combination of, revolving means for comminuting of the soil and throwing the comminuted soil upwardly and rearwardly, an elevating conveyor for receiving the thrown comminuted soil, a chamber having an opening in the top thereof for receiving the soil discharged from said elevating conveyor, means for distributing said soil throughout said chamber, a plurality of revolving burners within said chamber comprising perforated tubular members emitting flames from said perforations for directing the flames at the soil descending through said chamber and between said burners to burn out the combustible material therein, and means for discharging the flame treated soil onto the ground.

3. In a mobile agricultural implement for treating the soil, the combination of, revolving means for comminuting of the soil and throwing the comminuted soil upwardly and rearwardly, an elevating conveyor for receiving the thrown comminuted soil, a chamber having an opening in the top thereof for receiving the soil discharged from said elevating conveyor, a rotating member mounted within said chamber beneath the opening in the top of the chamber and rotatable in a plane substantially perpendicular to the path of the soil deposited in said opening to receive the soil for distributing the soil throughout the entire chamber, means within said chamber for directing flames at said soil distributed within said chamber to burn out weeds and weed seed therein, and means for discharging the flame treated soil onto the ground.

4. In a mobile agricultural implement for treating the soil, the combination of, revolving means for comminuting of the soil and throwing the comminuted soil upwardly and rearwardly, an elevating conveyor for receiving the thrown comminuted soil, a chamber having an opening in the top thereof for receiving the soil discharged from said elevating conveyor, a rotating member mounted within said chamber beneath the opening in the top of the chamber and rotatable in a plane substantially perpendicular to the path of the soil deposited in said opening to receive the soil for distributing the soil throughout the entire chamber, a plurality of revolving burners within said chamber comprising perforated tubular members emitting flames from said perforations for directing the flames at the soil descending through said chamber and between said burners to burn out the combustible material therein, and means for discharging the flame treated soil onto the ground.

5. In a mobile agricultural implement for treating the soil; the combination of; a plow; a harrow for breaking up the plowed soil; revolving means behind the harrow for picking up the soil on the ground broken up by the harrow, comminuting the soil and throwing the comminuted soil upwardly and rearwardly; an elevating conveyor for receiving the thrown comminuted soil; a chamber having an opening the top thereof for receiving the soil discharged from said elevating conveyor; a rotating member within said chamber beneath the opening in the top wall thereof to scatter the soil deposited through said opening throughout said chamber; a plurality of rotating burners emitting flames from the surfaces thereof for burning combustible material in the scattered soil descending between said burners; and means for discharging the flame treated soil onto the ground.

References Cited in the file of this patent

UNITED STATES PATENTS

| 366,927 | Clark | July 19, 1887 |
| 627,333 | Harvey | June 20, 1899 |
| 1,777,391 | Brewer | Oct. 7, 1930 |
| 1,802,211 | Lively | Apr. 21, 1931 |
| 1,906,127 | Reishus | Apr. 25, 1933 |
| 1,930,015 | Meyer | Oct. 10, 1933 |
| 2,781,592 | McKee | Feb. 19, 1957 |

FOREIGN PATENTS

| 209,362 | Great Britain | Jan. 10, 1924 |